United States Patent
Nakanishi et al.

(10) Patent No.: US 6,597,307 B2
(45) Date of Patent: Jul. 22, 2003

(54) METHOD AND RADAR FOR DETECTING DISTANCE TO A TARGET

(75) Inventors: Motoi Nakanishi, Nagaokakyo (JP); Toru Ishii, Hirakata (JP); Ikuo Takakuwa, Suita (JP); Tetsu Nishimura, Nagaokakyo (JP)

(73) Assignee: Murata Manufacturing Co. Ltd. (JP)

( * ) Notice: Subject to any disclaimer, the term of this patent is extended or adjusted under 35 U.S.C. 154(b) by 0 days.

(21) Appl. No.: 10/066,940

(22) Filed: Feb. 4, 2002

(65) Prior Publication Data

US 2002/0190895 A1 Dec. 19, 2002

(30) Foreign Application Priority Data

Mar. 5, 2001 (JP) ........................................ 2001-060063

(51) Int. Cl.$^7$ ............................................... G01S 13/93
(52) U.S. Cl. .............................. 342/70; 342/71; 342/72; 342/107; 342/133; 342/139; 342/146
(58) Field of Search .............................. 342/70, 71, 72, 342/107, 108, 109, 110, 113, 115, 118, 133, 135, 139, 145, 146, 147, 157, 158

(56) References Cited

U.S. PATENT DOCUMENTS

| | | | | |
|---|---|---|---|---|
| 5,592,170 A | * | 1/1997 | Price et al. .................... | 342/22 |
| 5,625,362 A | | 4/1997 | Richardson ................... | 342/70 |
| 5,675,518 A | * | 10/1997 | Kuroda et al. ................ | 702/97 |
| 6,028,548 A | * | 2/2000 | Farmer ......................... | 342/70 |
| 6,067,038 A | | 5/2000 | Uehara et al. ................ | 342/70 |
| 6,085,151 A | * | 7/2000 | Farmer et al. ............... | 701/301 |
| 6,311,123 B1 | * | 10/2001 | Nakamura et al. ........... | 701/96 |
| 6,496,770 B2 | * | 12/2002 | Winner et al. ................ | 701/96 |
| 2002/0190895 A1 | * | 12/2002 | Nakanishi et al. .......... | 342/146 |

FOREIGN PATENT DOCUMENTS

| | | |
|---|---|---|
| EP | 0 495 759 | 1/1992 |
| EP | 0 773 452 | 5/1997 |
| EP | 0 899 582 | 3/1999 |
| EP | 0 916 968 | 5/1999 |
| JP | 2000-338222 | 8/2000 |

OTHER PUBLICATIONS

Darricau, "Physique et Theorie du radar Tome 1 2eme Edition ISBN 2.901011.82.9", 1981, SADeniaud Freres, Bordeaux (France), pp. 46–47.

Machuzak R.J. et al., "New centroid algorithm based upon amplitude–angle signature", IEEE Transactins on Aerospace and Electronic Systems, IEEE Inc.., New York, vol. AES–19, No. 4, Jul. 1983, pp. 568–576.

\* cited by examiner

*Primary Examiner*—John B. Sotomayor
(74) *Attorney, Agent, or Firm*—Dickstein, Shapiro, Morin & Oshinsky, LLP.

(57) ABSTRACT

By changing the direction of a detection radio-wave beam within a detection-angle range and by detecting reflected-signal intensities, wherein each of the reflected-signal intensities is detected for each predetermined unit angle, moving averages of the reflected-signal intensities are calculated by using an angular width predetermined for a given distance as an average width. Thus, data of a reflected-signal-intensity distribution is obtained. Accordingly, the direction of a target is detected by finding the direction of the highest reflected-signal intensity.

16 Claims, 7 Drawing Sheets

METHOD AND RADAR FOR DETECTING DISTANCE TO A TARGET

BACKGROUND OF THE INVENTION

1. Field of the Invention

The present invention relates to a method and radar for detecting a vehicle or the like by using, for example, radio waves in the millimeter-wave band.

2. Description of the Related Art

A known radar mounted on a vehicle such as an automobile for measuring, for example, the distance between automobiles is disclosed in Japanese Unexamined Patent Application Publication No. 2000-338222.

The radar disclosed in the above publication can direct beams in three directions by beam-scanning means. When a target object (hereinafter referred to as the target) is detected in a plurality of beam directions, the radar calculates the angle of the target in accordance with the reflected-signal intensities corresponding to the plurality of directions. When the target is detected in only a single direction, the radar determines that the angle of the target is the same as the predetermined angle.

However, the above-described radar is not able to track the target at a resolution higher than in a case where the target is detected within the width of a detection radio-wave beam. Since the angle corresponding to the highest reflected-signal intensity does not necessarily indicate the center of the target, the precision of finding the direction of the target is low.

SUMMARY OF THE INVENTION

Accordingly, it is an object of the present invention to provide a method for detecting and a radar with higher position-detecting precision. The method and radar are capable of detecting the direction of the target at a resolution higher than in a case where the target is detected within the width of the detection radio-wave beam. Further, the method and radar are capable of solving the problem that arises when the highest reflected-signal intensity does not correspond to the center of the target.

The radar comprises means for detecting reflected-signal intensities, each of the reflected-signal intensities obtained for a predetermined unit angle by changing the direction of a beam within a detection-angle range. The radar further comprises means for detecting data of a reflected-signal-intensity distribution by calculating moving averages of the reflected-signal intensities by using an angular width predetermined for a given distance as an average width.

Generally, when the width of the beam is larger than the unit angle predetermined for beam scanning (hereinafter referred to as the space between the beams), or when the target is larger than the space between the beams, the signals reflected from the target will be detected continually with the beam scanning. That is, the reflected signals are detected by neighboring plurality of beams.

However, the reflected-signal intensities greatly vary depending on the shape or direction of the target. Therefore, the intensity of the signal reflected from the center of the target, that is, the reflected-signal intensity of the center one of the above-described plurality of beams is not necessarily the highest. However, the reflective-signal intensities which change in accordance with the change of the angle of the beams form a peak-like shape, irrespective of the reflected-signal intensity of the each of beams. As described above, the moving averages of the reflected-signal intensities are calculated by using the predetermined angle width as the average width, for the given distance. Accordingly, the obtained data of the reflected-signal-intensity distribution, which shows the shape of the target projected by the beams, is unaffected by the direction of the target.

The radar further comprises means for detecting a direction of the highest reflected-signal intensity from among the data of the reflected-signal-intensity distribution, for the given distance. Accordingly, the direction corresponding to the center of the target is detected by simple processes.

The radar further comprises means for detecting a direction corresponding to the barycenter of the reflected-signal intensities from among the data of the reflected-signal-intensity distribution, for the given distance. Accordingly, the center direction of the target is more accurately detected by detecting the target within a range smaller than the space between the beams. That is, the target can be detected in a range narrower than the space between the beams. This means that the target can be detected without using the space between the beams as the unit of the detection.

The radar farther comprises means for detecting a direction corresponding to the center of an angular range where the reflected-signal intensities exceed a predetermined threshold value from among the data of the reflected-signal-intensity distribution, for the given distance. Suppose that signals are reflected from the target in a short distance, and are observed within a wide angular range. In such a case, the moving averages calculated from the reflected signals do not form a steep peak. However, the above-described means readily detects the center direction of the target. The above-described means removes reflected signals having low intensities or reflected signals which have been generated by something other than the target and reflected signals that are not important for detecting the center direction of the target, thereby easily detecting the center direction of the target.

In the present invention, the average width used for the moving-average processes is reduced, at least in the vicinity of both ends of the detection-angle range, with increasing proximity to both ends, whereby the moving-average processes can be performed even in the vicinity of both ends of the detection-angle range. Accordingly, the direction of the target can be detected within the entire detection-angle range.

Further, in this invention, the average width used for the moving-average processes is reduced as the distance between the radar and the target to be detected increases. This means that the moving average corresponds to the number of the beams which radiate the target. The number of the beams is determined according to the distance between an antenna and the target. Accordingly, a problem of the varying precision of finding the direction of the target, which arises from the changing distance between the antenna and the target changes, is solved.

In accordance with one aspect, the radar comprises a detection circuit for detecting reflected-signal intensities of reflected signals from a target, the detection circuit including an antenna, a circulator, a mixer and an IF amplifier, wherein the antenna receives the reflected signals and provides them to the circulator, the mixer receives the reflected signal from the circulator and mixes the reflected signal with a signal proportional to a transmitted signal to generate an IF signal, and the IF amplifier amplifies the IF signal, and wherein each of the reflected signal intensities is detected for a predetermined unit angle by changing the direction of a detection radio-wave beam within a detection-angle range;

and a programmed CPU for performing moving-average processes for obtaining data of a reflected-signal-intensity distribution by calculating moving averages of the reflected-signal intensities by using an angular width predetermined for a given distance as an average width.

The method of determining the distance to a target comprises transmitting a detection radio-wave beam to the target; detecting reflected-signal intensities of signals reflected from the target, wherein each of the reflected signal intensities is detected for a predetermined unit angle by changing the direction of the detection radio-wave beam within a detection-angle range; and performing moving-average processes for obtaining data of a reflected-signal-intensity distribution by calculating moving averages of the reflected-signal intensities by using an angular width predetermined for a given distance as an average width.

Other features and advantages of the present invention will become apparent from the following description of the invention which refers to the accompanying drawings.

BRIEF DESCRIPTION OF THE DRAWING(S)

Figure 8A:
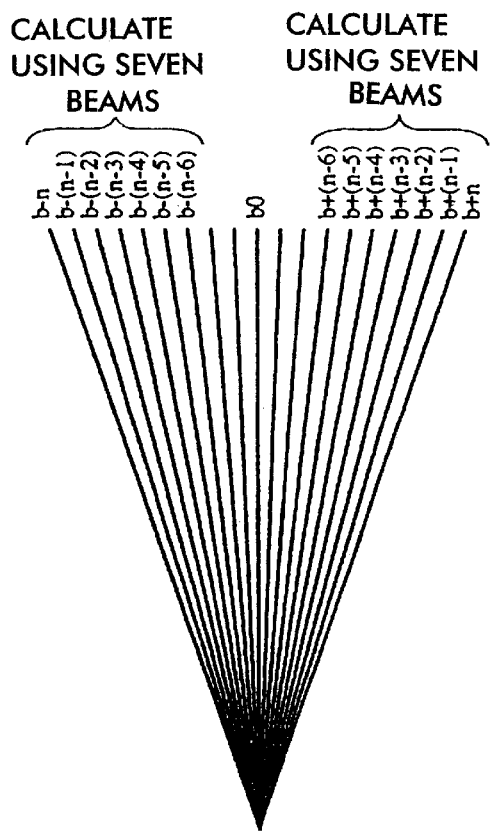
FIG. 8A shows how moving-average processes in the vicinity of both ends of a detection-angle range are performed, according to a fourth embodiment.
Figure 8B:
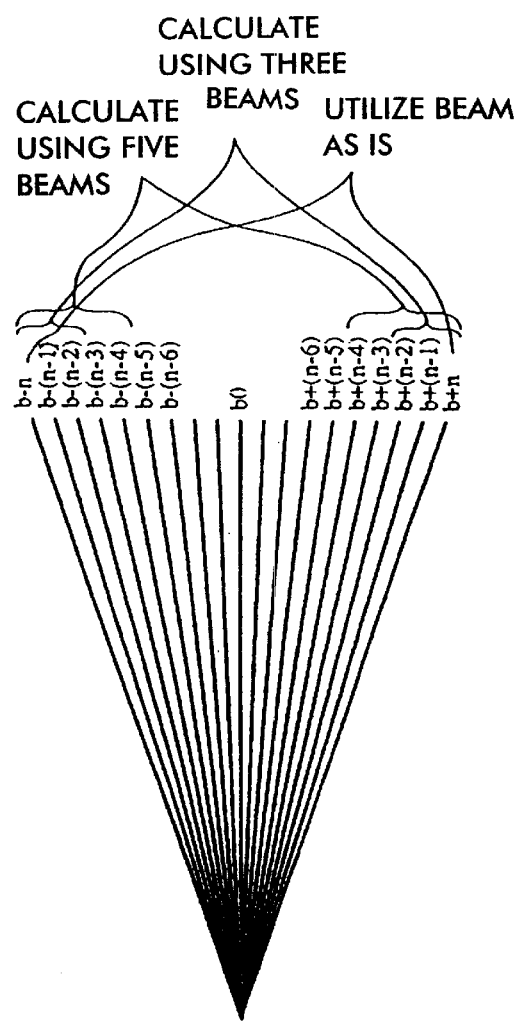
Figure 9:
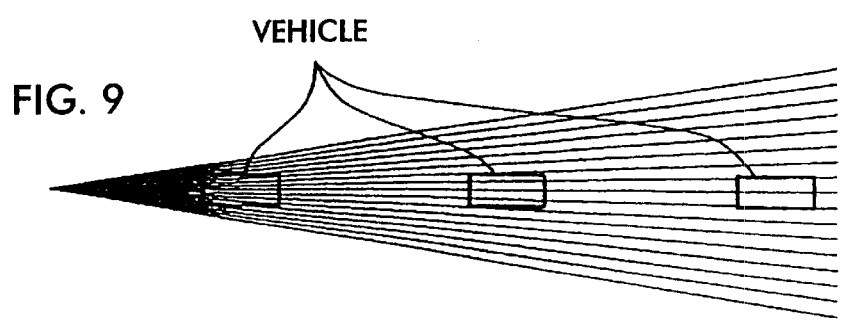

FIG. 8B also shows how moving-average processes in the vicinity of both ends of the detection-angle range are performed, according to the fourth embodiment; and FIG. 9 illustrates an average width used for moving-average processes performed for a radar according to a fifth embodiment.

DETAILED DESCRIPTION OF EMBODIMENTS OF THE INVENTION

The configuration of a radar according to a first embodiment of the present invention will now be described with reference to FIG. 1, FIG. 2, FIGS. 3A, 3B and 3C, and FIG. 4.

Figure 1:
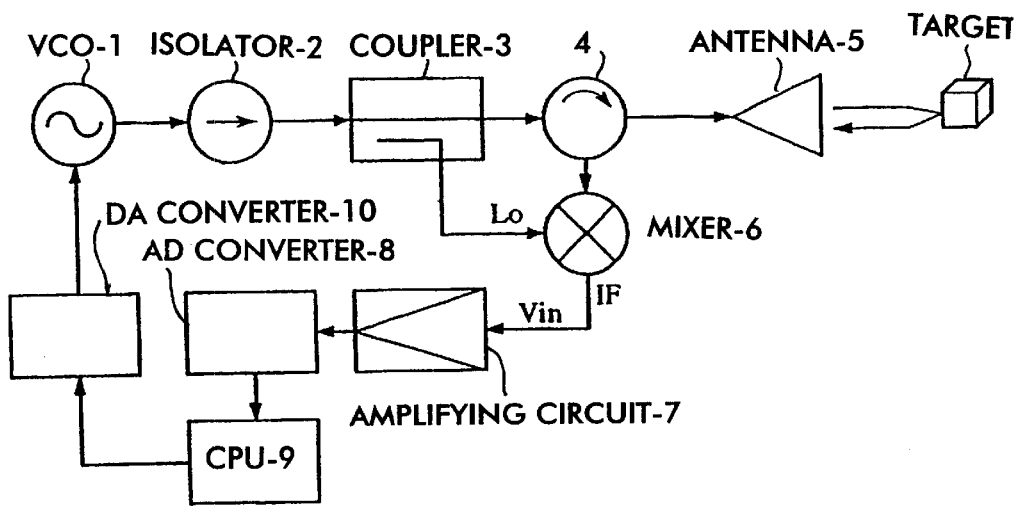
FIG. 1 is a block diagram showing the configuration of a radar according to a first embodiment.

FIG. 1 is a block diagram showing the configuration of the radar. The radar comprises a voltage-controlled oscillator 1 (hereinafter referred to as the VCO 1), an isolator 2, a coupler 3, a circulator 4, an antenna 5, a mixer 6, an IF-amplifying circuit 7, an analog-to-digital converter 8 (hereinafter referred to as the AD converter 8), a CPU 9, and a digital-to-analog converter 10 (hereinafter referred to as the DA converter 10). FIG. 1 also shows an object target (hereinafter referred to as the target).

The VCO 1 oscillates and transmits a signal to the isolator 2. The VCO 1 changes the oscillation frequency according to a control voltage output from the DA converter 10. The isolator 2 transmits the signal to the coupler 3. The coupler 3 transmits the signal to the circulator 4. The coupler 3 transmits a portion of the signal to the mixer 6 at a predetermined distribution ratio. This portion of the signal functions as a local signal Lo. The circulator 4 transmits the signal transmitted from the coupler 3 to the antenna 5. The antenna 5 radiates a millimeter-wave beam (hereinafter referred to as the beam) in a given direction, the beam forming a continuous wave frequency modulated by the VCO 1. Further, the antenna 5 receives a reflected signal from the same direction, and transmits the reflected signal to the circulator 4. The antenna 5 periodically changes the direction of the beam within a predetermined detection-angle range. Upon receiving the reflected signal from the antenna 5, the circulator 4 transmits the reflected signal to the mixer 6. Incidentally, when the reflected signal enters through the antenna, the isolator 2 prevents the reflected signal from entering the VCO 1.

The mixer 6 mixes the local signal Lo, which is transmitted from the coupler 3, with the reflected signal transmitted from the circulator 4. Then, the mixer 6 outputs an intermediate-frequency signal (hereinafter referred to as the IF signal), and transmits the IF signal to the IF-amplifying circuit 7. The IF-amplifying circuit 7 amplifies the IF signal by a predetermined gain that varies according to the distance between the antenna 5 and the target, and transmits the IF signal to the AD converter 8. The AD converter 8 changes the amplified voltage signal to digital data, and transmits the digital data to the CPU 9. The CPU 9 temporarily stores as much digital data as needed for at least one scan. Namely, the amount of digital data corresponds to a plurality of beams within the predetermined detection-angle range. Then, the CPU 9 calculates the direction of the target centered on the antenna 5. The CPU 9 further calculates the distance between the antenna 5 and the target, and the relative speed of the target to the antenna 5. Further, the CPU 9 sequentially outputs the digital data or the digitally-modulated signal to the DA converter 10. Consequently, the oscillation frequency of the VCO 1 is continually frequency-modulated, whereby the oscillation frequency forms triangular waves.

Figure 2:
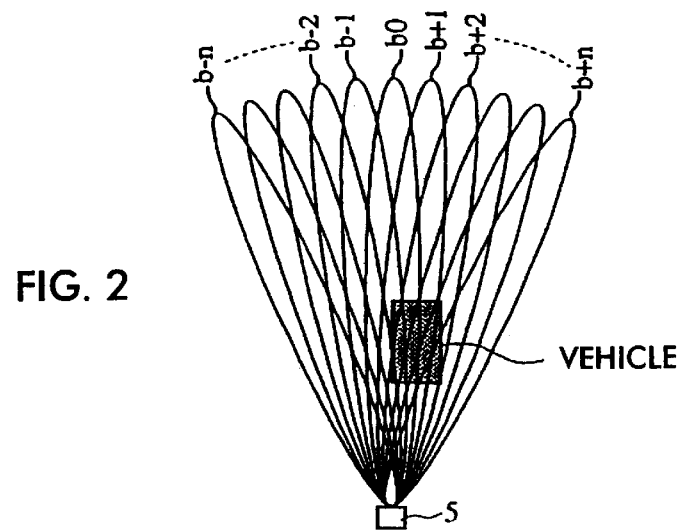
FIG. 2 shows the positional relationship between an antenna, beams, and a target.

FIG. 2 shows the positional relationship between a vehicle as the target, the antenna 5, beams b−n to b−2, beams b−1, b0, b+1, and beams b+2 to b+n. This figure is provided to illustrate the positional relationships between the vehicle, the antenna 5, and the beams. The beams are radio waves radiated by the antenna 5. The antenna 5 is steered within the detection-angle range for performing beam scanning.

Figure 3A:
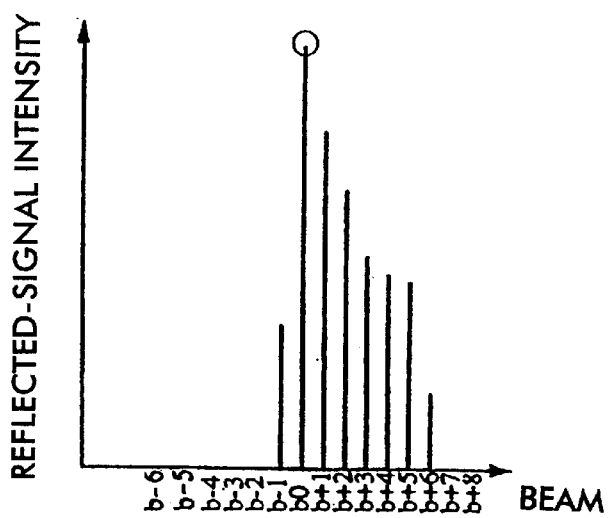
FIG. 3A shows original reflected-signal intensities, that is, reflected-signal intensities that have not yet been subjected to moving-average processes.
Figure 3B:
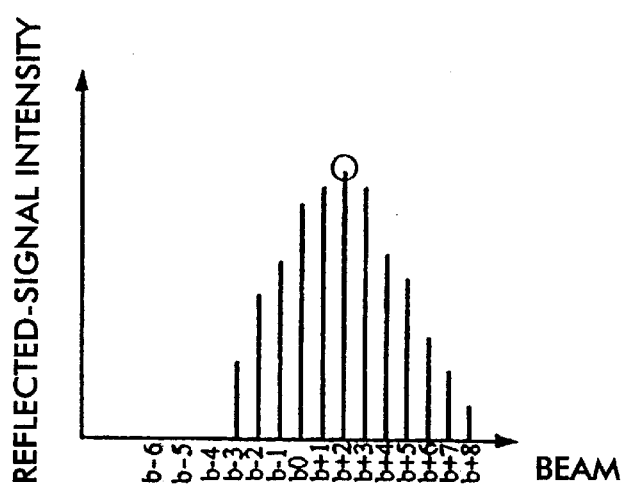
FIG. 3B shows data of a reflected-signal-intensity distribution obtained by calculating moving averages of the original reflected-signal intensities, for illustrating how to detect the direction of the target.
Figure 3C:
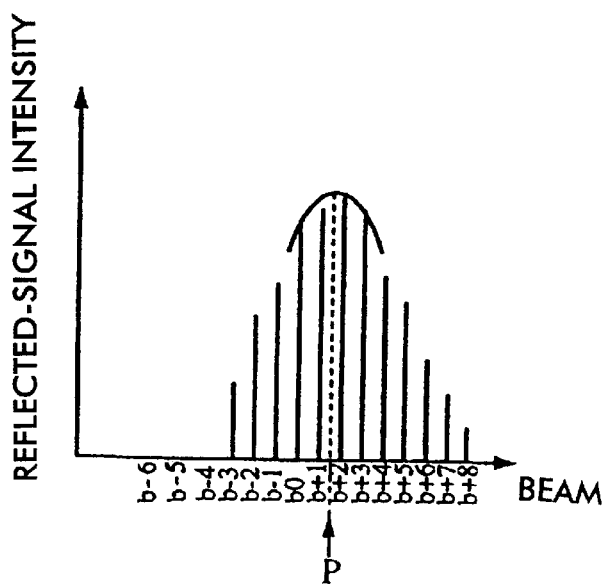
FIG. 3C shows the data of the reflected-signal-intensity distribution for illustrating how to detect the direction of the target.

FIGS. 3A, 3B, and 3C illustrate how reflected-signal intensities change in accordance with the beam scanning. FIG. 3A shows the original reflected-signal intensities. Hereinafter, the word "original" indicates that the reflected-signal intensities have not yet been subjected to moving-average processes. FIGS. 3B and 3C show the reflected-signal intensities that have been subjected to the moving-average processes, wherein the width corresponding to five beams is used as an average width. For example, the reflected-signal intensity of the beam b−4 shown in FIGS. 3B and 3C is the average of the original reflected-signal intensities of the five beams b−6 to b−2. The beam b−3 in FIGS. 3B and 3C is the average of the original reflected-signal intensities of the five beams b−5 to b−1. Similarly, the reflected-signal intensity of the beam b0 shown in FIGS. 3B and 3C is the average of the original reflected-signal intensities of the five beams b−2 to b+2.

As shown in FIG. 2, the beams are radiated in a direction inclining toward the vehicle. That is to say, the sides, the front, and the rear of the vehicle are inclined toward the axes of the beams. In such a case, the reflected-signal intensities of the beams are low. However, when the beams radiate perpendicularly to a certain part of the vehicle, say, a corner part of the vehicle, the obtained reflected-signal intensities corresponding to the corner part are high. Subsequently, as shown in FIG. 3A, the direction of the beam where the reflected-signal intensity is the highest does not correspond to the center of the vehicle projected by the beams.

However, the change of the reflected-signal intensity is smoothed for each beam by performing the moving-average processes wherein a predetermined angular width is used as the average width for calculating the moving average of the reflected-signal intensities. Subsequently, as shown in FIGS. 3B and 3C, data of a reflected-signal-intensity distribution (hereinafter referred to as the intensity-distribution data) is obtained. The intensity-distribution data forms a peak-like shape.

In FIG. 3B, the reflected-signal intensity of the beam b+2, which is obtained by performing the moving-average processes, becomes the highest, and is marked with a circle. That is, the direction of the beam b+2 is detected as the direction of the target.

In the example shown in FIG. 3C, the barycenter of the reflected-signal intensities corresponding to the directions of the beams is obtained for detecting the direction of the target from the intensity-distribution data. Reference character P shown in this figure represents the position of the barycenter. According to this method of obtaining the barycenter, even when the number of the beams radiated on the target is small, the direction of the target can be detected more accurately than in the case where the direction of the target is detected only by detecting the part of the target which is radiated by the beams. That is, in this method, even the direction of the target between neighboring beams can be detected.

When the distance between the antenna 5 and the target is 50 to 100 meters, a suitable distance for tracking the vehicle, the average width may preferably be set so as to correspond to the angular range from 1° to 4°. A 1° angle corresponds to the width of a regular passenger car (1.7 meters), and a 4° angle corresponds to the width of a lane (3.5 meters). When the angle between the beams is 0.3°, the width of three to thirteen beams is suitable as the average width used for performing the moving-average processes.

Figure 4:
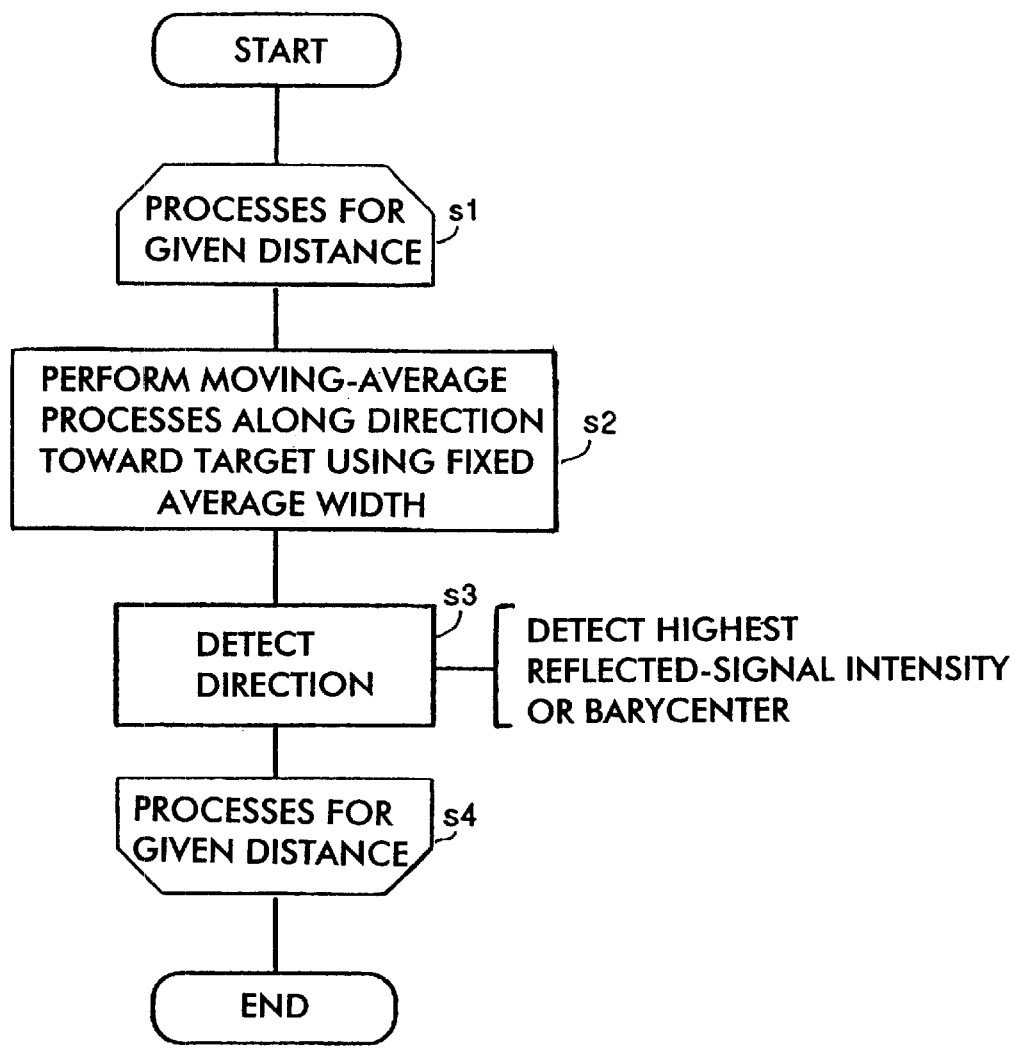
FIG. 4 shows processes performed by a CPU of the radar according to the first embodiment.

FIG. 4 is a flowchart showing the processes performed by the CPU 9. Steps s2 and s3 are shown between step s1 and step s4. Namely, steps s1 to s4 form a processing loop that is repeatedly performed at predetermined distances between the antenna 5 and the target. For example, for obtaining the intensity-distribution data every meter when the distance between the antenna 5 and the target is 10 to 180 meters, the processing loop is repeated 170 times. At step s2, the moving average of the reflected-signal intensities of the beams is calculated for each predetermined distance along the directions of the beams toward the target, using a predetermined average width. Accordingly, the intensity-distribution data is obtained. At step s3, from the intensity-distribution data, the direction of the beam, or the barycenter of the beams where the reflected-signal intensity is the highest, is detected as the direction of the target.

The configuration of a radar according to a second embodiment will now be described with reference to FIGS. 5A, 5B, and 5C, and FIG. 6.

Figure 5A:
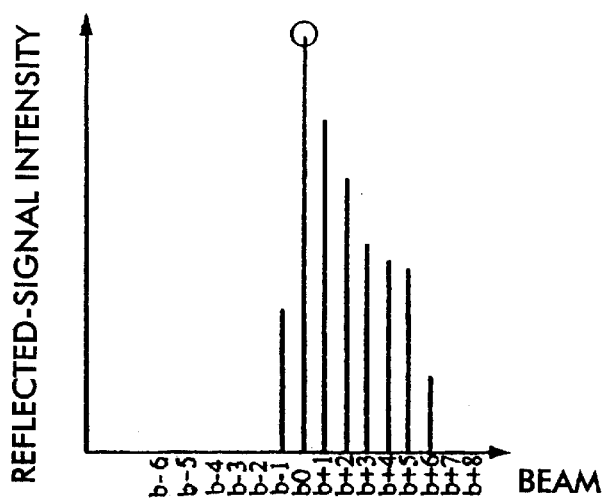
FIG. 5A shows original reflected-signal intensities, that is, reflected-signal intensities that have not yet been subjected to moving-average processes, for illustrating how to detect the direction of the target by a radar according to a second embodiment.
Figure 5B:
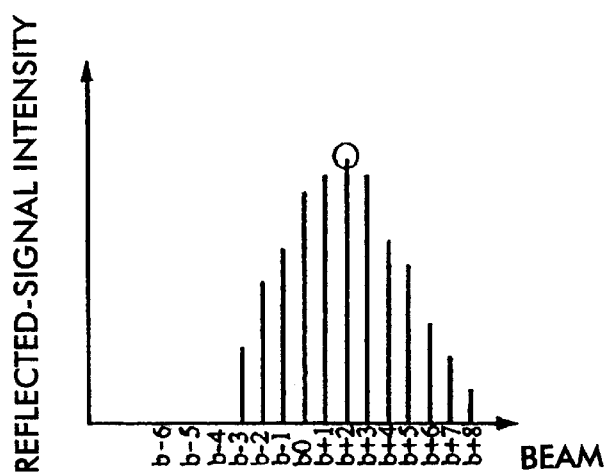
FIG. 5B shows data of a reflected-signal-intensity distribution obtained by calculating moving averages of the original reflected-signal intensities, for illustrating how to detect the direction of the target by the radar according to the second embodiment.
Figure 5C:
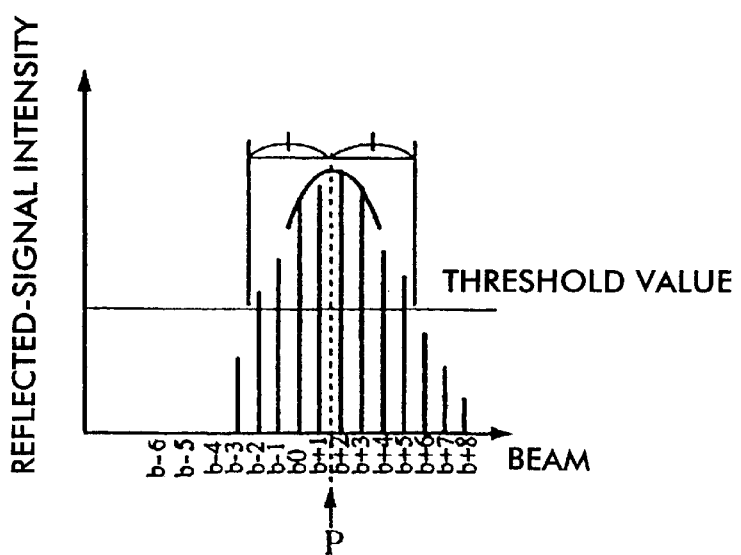
FIG. 5C shows the data of the reflected-signal-intensity distribution for illustrating how to detect the direction of the target by the radar according to the second embodiment.

FIGS. 5A to 5C show how the reflected-signal intensities change in accordance with the above-described beam scanning. FIG. 5A shows the original reflected-signal intensities. FIG. 5B shows the reflected-signal intensities obtained by performing the moving-average processes in which the width of five beams is used as the average width. FIG. 5C shows an example where the direction of the target is detected by extracting the beams whose reflected-signal intensities exceed a predetermined threshold value, and by finding the direction corresponding to the center of the angular range.

Figure 6:
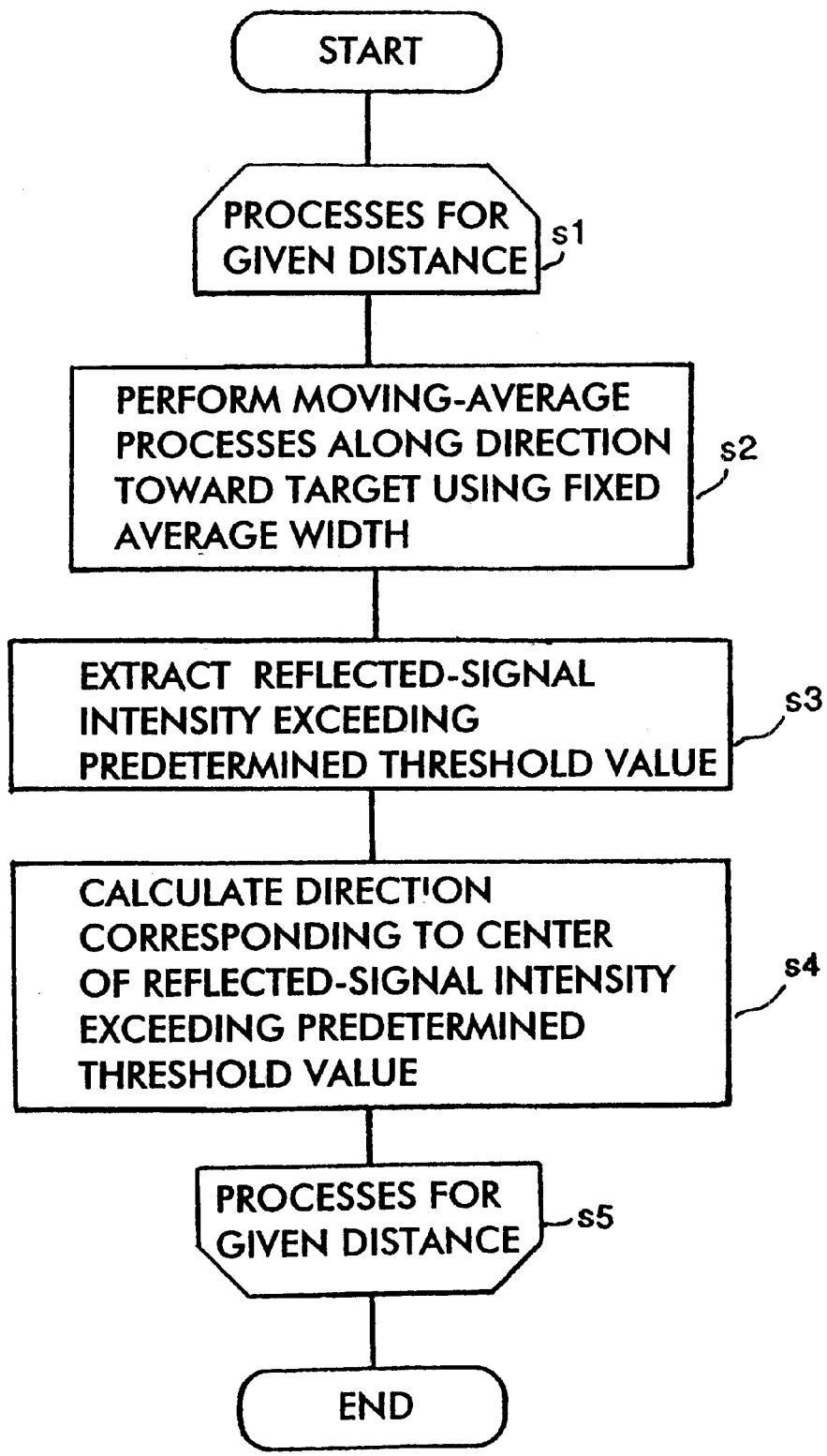
FIG. 6 shows processes performed by a CPU of the radar according to the second embodiment.

FIG. 6 is a flowchart showing the above-described processes performed by the CPU 9. As in the case shown in FIG. 4, step s2, step s3, and step s4, which are shown between step s1 and step s5, form a processing loop which is repeatedly performed at predetermined distances between the antenna 5 and the target. At step s3, the reflected-signal intensities exceeding a predetermined threshold value are extracted from the intensity-distribution data obtained by the moving-average processes. At step s4, the direction corresponding to the center of the angular range is detected. The direction does not necessarily match with the directions of the beams. In the example shown in FIG. 5C, the direction P is detected as the direction of the target. Thus, according to this embodiment, the direction of the target is detected more accurately by detecting the directions between the beams than in the case where only the directions of the beams are detected.

Figure 7A:
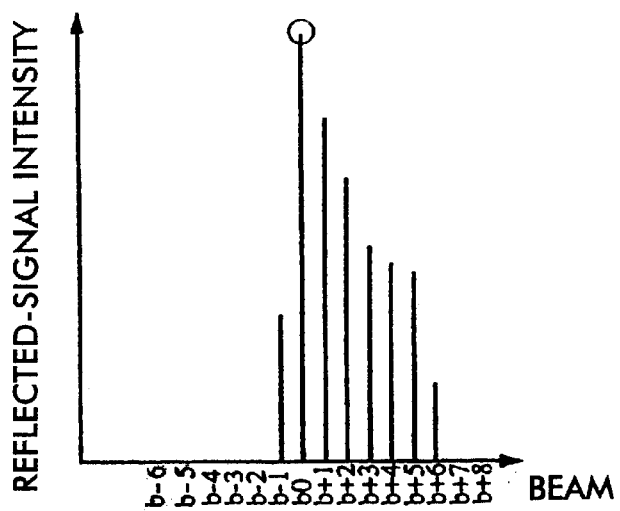
FIG. 7A shows original reflected-signal intensities, that is, reflected-signal intensities that have not yet been subjected to moving-average processes, for illustrating how to detect the position of the target by a radar according to a third embodiment.
Figure 7B:
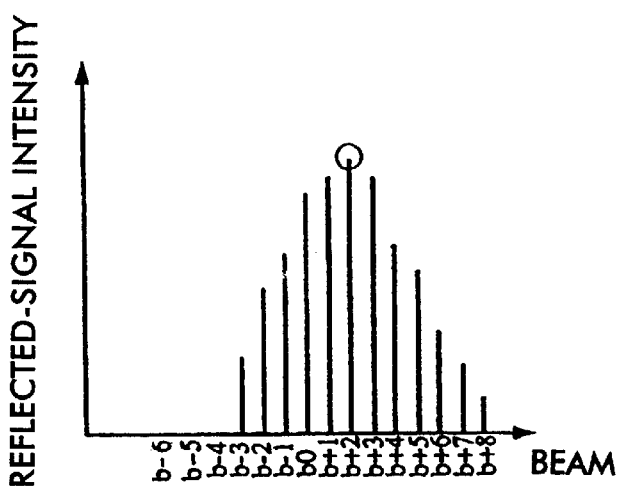
FIG. 7B shows data of a reflected-signal-intensity distribution obtained by calculating moving averages of the original reflected-signal intensities, for illustrating how to detect the position of the target by the radar according to the third embodiment.
Figure 7C:
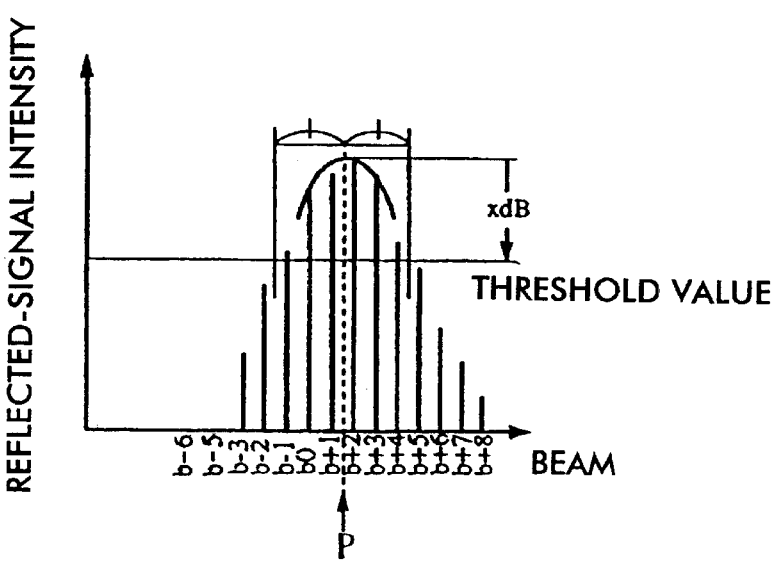
FIG. 7C shows the data of the reflected-signal-intensity distribution for illustrating how to detect the position of the target by the radar according to the third embodiment.

A radar according to a third embodiment will now be described with reference to FIGS. 7A, 7B, and 7C.

In the second embodiment, the predetermined threshold value is used for selecting the high reflected-signal intensities from the intensity-distribution data obtained by the moving-average processes.

In this embodiment, however, the threshold value is set as the value obtained by subtracting a predetermined amount of dB from the peak value or the highest reflected-signal intensity. Namely, the threshold value determined for extracting an angular range where the reflected-signal intensities are high is fixed as a relative amount with respect to the peak value or the highest reflective-signal intensity. Accordingly, an area where the reflected-signal intensities are high is stably extracted from the intensity-distribution data, without being affected by the size (scattering cross section) and the electromagnetic-wave reflectivity of the target and the distance between the target and antenna 5.

Next, a radar according to a fourth embodiment will now be described with reference to FIGS. 8A and 8B.

When the seven beams are used as the average width for performing the moving-average processes to obtain the intensity-distribution data, it means that the average of seven neighboring reflected-signal intensities is calculated. However, at both ends of the detection-angle range, the number of reflected-signal intensities for which the average is calculated is less than seven. As shown in FIG. 8A, the reflected-signal intensity of the beam b−(n−3) is obtained by calculating the moving average of the original reflected-signal intensities of the seven beams b−(n) to b−(n−6). Similarly, the reflected-signal intensity of the beam b+(n−3) is obtained by calculating the moving average of the original reflected-signal intensities of the seven beams b+(n) to b+(n−6).

As shown in FIG. 8B, the average width of the beams nearer to the end of the detection-angle range than the beam b−(n−3) is smaller than that of the beam b−(n−3), and the average width of the other beams nearer to the another end of the detection-angle range than the beam b+(n−3) is smaller than that of the beam b+(n−3). For example, the reflected-signal intensity of the beam b−(n−2) is obtained by calculating the moving average of the original reflected-signal intensities of the five beams b−(n) to b−(n−4). The reflected-signal intensity of the beam b+(n−2) is obtained by calculating the moving average of the original reflected-signal intensities of the five beams b+(n) to b+(n−4). Further, the reflected-signal intensity of the beam b−(n−1) is obtained by calculating the moving average of the original reflected-signal intensities of the three beams b−(n) to b−(n−2), while the reflected-signal intensity of the beam b+(n−1) is obtained by calculating the moving average of the original reflected-signal intensities of the three beams b+(n) to b+(n−2). As for the outermost beams, namely, for the beam b−(n) and the beam b+(n), the original reflected-signal intensities thereof are used as the reflected-signal intensities. Thus, the moving-average processes are performed within the entire detection-angle range. Therefore, narrowing of the detection-angle range is prevented.

A radar according to a fifth embodiment will now be illustrated with reference to FIG. 9.

The length of the beams, that is, the direction perpendicular to the width of the detection-angle range, changes in accordance with the distance between the antenna 5 and the target. Therefore, the number of beams radiating the vehicle, which corresponds to the width of the vehicle, changes in accordance with the distance between the antenna 5 and the vehicle. Suppose that the average width suitable for a case where the distance between the antenna 5 and the target is short is used in a case where the distance is long, for obtaining the intensity-distribution data by the above-described moving-average processes. In such a case, the accuracy of measurement performed within the detection angle deteriorates, because a plurality of vehicles and objects on the sidewalks within the angular range are detected. Accordingly, in this embodiment, the average width used for the moving-average processes is changed according to the distance between the antenna 5 and the vehicle, using the angular range corresponding to the width of the vehicle or the target as an index.

For example, suppose that the width of the vehicle is 1.7 meters, and the angle between the radiating beams is 0.5°. When the distance between the antenna 5 and the vehicle is 10 meters, the number of beams corresponding to the average width is nineteen, according to the equation:

$$\tan^{-1}(1.7/10)/0.5=19.3$$

Furthermore, when the distance between the antenna 5 and the vehicle is 30 meters, the number of beams corresponding to the average width is six, according to the equation:

$$\tan^{-1}(1.7/30)/0.5=6.49$$

The equations show the number of beams corresponding to the average width suitable for several distances.

| Distance | Equation | Number of beams |
|---|---|---|
| 10 m | $\tan^{-1}(1.7/10)/0.5 = 19.3 \rightarrow$ | 19 |
| 30 m | $\tan^{-1}(1.7/30)/0.5 = 6.49 \rightarrow$ | 6(7) |
| 70 m | $\tan^{-1}(1.7/70)/0.5 = 2.78 \rightarrow$ | 3 |
| 100 m | $\tan^{-1}(1.7/100)/0.5 = 1.95 \rightarrow$ | 2(1) |
| 15 m | $\tan^{-1}(1.7/150)/0.5 = 1.30 \rightarrow$ | 1 |

Thus, when the moving-average processes are performed for each of the predetermined distances, the average width may also be adjusted for each of the predetermined distances. Subsequently, the direction of the target substantially as large as assumed is detected with high precision, without being affected by the distance between the antenna 5 and the target.

Furthermore, it is better to use an odd number of data values for performing the moving-average processes, since the average of the data on both sides of the center data can be readily calculated. If the number of data values is even, the number of beams shown in parentheses may be used. When the distance between the antenna 5 and the vehicle exceeds 150 meters, the number of beams suitable for the average width is one. In such a case, the single beam corresponds to the average width. Therefore, the original reflected-signal intensity of the single beam is used as is, without performing the moving-average processes.

The moving average may be calculated by simple arithmetic-average processes. However, it is also possible to calculate the average by weighted-average processes, by increasing the weight of the reflected-signal intensity positioned at the center, and by reducing the weight of the other reflected-signal intensity with decreasing proximity to the center. Thus, the smoothing effect which is produced when the average width is large is reduced. Accordingly, the peak value of the intensity-distribution data is readily detected.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A radar comprising:
   means for detecting reflected-signal intensities, wherein each of the reflected signal intensities is detected for a predetermined unit angle by changing the direction of a detection radio-wave beam within a detection-angle range; and
   means for performing moving-average processes for obtaining data of a reflected-signal-intensity distribution by calculating moving averages of the reflected-signal intensities by using an angular width predetermined for a given distance as an average width.

2. A radar according to claim 1, further comprising means for detecting a direction of the highest reflected-signal intensity from among the data of the reflected-signal-intensity distribution for the given distance.

3. A radar according to claim 1, further comprising means for detecting a direction corresponding to the barycenter of the reflected-signal intensities from among the data of the reflected-signal-intensity distribution for the given distance.

4. A radar according to claim 1, further comprising means for detecting a direction corresponding to the center of an angular range where the reflected-signal intensities exceed a predetermined threshold value from among the data of the reflected-signal-intensity distribution for the given distance.

5. A radar according to any one of claims 1 to 4, wherein the means for performing the moving-average processes gradually reduces the average width used for the moving-average processes, at least in the vicinity of both ends of the detection-angle range with increasing proximity to both ends.

6. A radar according to any one of claims 1 to 4, wherein the means for performing the moving-average processes reduces the average width used for the moving-average processes as the distance to a target to be detected increases.

7. A radar according to claim 5, wherein the means for performing the moving-average processes reduces the average width used for the moving-average processes as the distance to a target to be detected increases.

8. A radar comprising:

a detection circuit for detecting reflected-signal intensities of reflected signals from a target, the detection circuit including an antenna, a circulator, a mixer and an IF amplifier, wherein the antenna receives the reflected signals and provides them to the circulator, the mixer receives the reflected signal from the circulator and mixes the reflected signal with a signal proportional to a transmitted signal to generate an IF signal, and the IF amplifier amplifies the IF signal, and wherein each of the reflected signal intensities is detected for a predetermined unit angle by changing the direction of a detection radio-wave beam within a detection-angle range; and a programmed CPU for performing moving-average processes for obtaining data of a reflected-signal-intensity distribution by calculating moving averages of the reflected-signal intensities by using an angular width predetermined for a given distance as an average width.

9. A radar as in claim 8, wherein the IF amplifier amplifies the IF signal by a predetermined gain that varies according to the distance between the antenna and the target.

10. A method of determining the distance to a target comprising:

transmitting a detection radio-wave beam to the target;

detecting reflected-signal intensities of signals reflected from the target, wherein each of the reflected signal intensities is detected for a predetermined unit angle by changing the direction of the detection radio-wave beam within a detection-angle range; and performing moving-average processes for obtaining data of a reflected-signal-intensity distribution by calculating moving averages of the reflected-signal intensities by using an angular width predetermined for a given distance as an average width.

11. A method according to claim 10, further comprising detecting a direction of the highest reflected-signal intensity from among the data of the reflected-signal-intensity distribution for the given distance.

12. A method according to claim 10, further comprising detecting a direction corresponding to the barycenter of the reflected-signal intensities from among the data of the reflected-signal-intensity distribution for the given distance.

13. A method according to claim 10, further comprising detecting a direction corresponding to the center of an angular range where the reflected-signal intensities exceed a predetermined threshold value from among the data of the reflected-signal-intensity distribution for the given distance.

14. A method according to any one of claims 10 to 13, wherein performing the moving-average processes gradually reduces the average width used for the moving-average processes, at least in the vicinity of both ends of the detection-angle range with increasing proximity to both ends.

15. A method according to any one of claims 10 to 13, wherein performing the moving-average processes reduces the average width used for the moving-average processes as the distance to a target to be detected increases.

16. A method according to claim 14, wherein performing the moving-average processes reduces the average width used for the moving-average processes as the distance to a target to be detected increases.

* * * * *